United States Patent
Kojima (10) Patent No.: US 10,041,426 B2
(45) Date of Patent: Aug. 7, 2018

(54) CONTROL APPARATUS AND CONTROL METHOD FOR INTERNAL COMBUSTION ENGINE

(71) Applicant: TOYOTA JIDOSHA KABUSHIKI KAISHA, Toyota-shi, Aichi-ken (JP)

(72) Inventor: Susumu Kojima, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 11 days.

(21) Appl. No.: 15/319,626

(22) PCT Filed: Jun. 8, 2015

(86) PCT No.: PCT/IB2015/000862
§ 371 (c)(1),
(2) Date: Dec. 16, 2016

(87) PCT Pub. No.: WO2015/193713
PCT Pub. Date: Dec. 23, 2015

(65) Prior Publication Data
US 2017/0138286 A1     May 18, 2017

(30) Foreign Application Priority Data

Jun. 19, 2014 (JP) ................................ 2014-126738

(51) Int. Cl.
*F02M 41/00* (2006.01)
*F02D 41/04* (2006.01)
(Continued)

(52) U.S. Cl.
CPC ............ *F02D 41/042* (2013.01); *F02B 75/02* (2013.01); *F02D 37/02* (2013.01); *F02D 41/26* (2013.01);
(Continued)

(58) Field of Classification Search
CPC .... F02D 41/042; F02D 41/26; F02D 41/3005; F02D 37/02; F02D 2200/101; F02B 75/02; F02B 2075/027
(Continued)

(56) References Cited

U.S. PATENT DOCUMENTS 5,611,314 A * 3/1997 Fuwa .................... F02D 41/042
123/491
6,474,291 B2 * 11/2002 Collins .................... F01L 9/04
123/198 DB
(Continued)

FOREIGN PATENT DOCUMENTS

JP    2005-180208 A    7/2005
JP    2006-188960 A    7/2006
(Continued)

*Primary Examiner* — Thomas Moulis
(74) *Attorney, Agent, or Firm* — Oliff PLC (57) ABSTRACT

A control apparatus for a four-cycle internal combustion engine that includes a plurality of cylinders into which fuel is directly injected, includes an electronic control unit. The electronic control unit is configured to: (i) execute stop control that stops rotation of a crankshaft of the internal combustion engine by stopping fuel injection and ignition in the internal combustion engine when a predetermined stop condition is fulfilled; and (ii) carry out fuel injection and ignition in a second cylinder of the plurality of the cylinders when the stop control is executed, the second cylinder being in an exhaust stroke when the internal combustion engine is stopped, when a piston of a first cylinder of the plurality of the cylinders is estimated to stop at a top dead center.

5 Claims, 9 Drawing Sheets (51) Int. Cl.
  *F02D 41/30* (2006.01)
  *F02D 41/26* (2006.01)
  *F02D 37/02* (2006.01)
  *F02B 75/02* (2006.01)
(52) U.S. Cl.
  CPC .... *F02D 41/3005* (2013.01); *F02B 2075/027* (2013.01); *F02D 2200/101* (2013.01)
(58) Field of Classification Search
  USPC .......................................................... 701/112
  See application file for complete search history.

(56) References Cited

U.S. PATENT DOCUMENTS

| | | | |
|---|---|---|---|
| 8,155,864 B2 * | 4/2012 | Picron | F02D 13/08 123/198 F |
| 2005/0115534 A1 * | 6/2005 | Tsuji | F02D 17/00 123/179.16 |
| 2005/0211194 A1 * | 9/2005 | Hanson | F02D 41/009 123/21 |
| 2006/0016411 A1 | 1/2006 | Flanagan et al. | |
| 2006/0185637 A1 * | 8/2006 | Mitsuhori | F02D 37/02 123/179.5 |
| 2007/0131188 A1 * | 6/2007 | Hokuto | F02B 17/005 123/179.4 |
| 2008/0115760 A1 * | 5/2008 | Nakamura | F02D 41/0087 123/333 |
| 2009/0070020 A1 * | 3/2009 | Tetsuno | F02D 35/026 701/113 |
| 2010/0083926 A1 | 4/2010 | Okumoto et al. | |
| 2010/0204908 A1 | 8/2010 | Nakai | |
| 2011/0174256 A1 * | 7/2011 | Aso | F02D 41/0082 123/179.4 |
| 2012/0006291 A1 * | 1/2012 | Nishikiori | F02D 13/08 123/90.15 |
| 2012/0312269 A1 * | 12/2012 | Fujiwara | F02N 15/06 123/179.4 |
| 2013/0226439 A1 * | 8/2013 | Hashemi | F02D 41/0295 701/112 |
| 2017/0356356 A1 * | 12/2017 | Matsushita | F02D 41/0087 |

FOREIGN PATENT DOCUMENTS

| | | |
|---|---|---|
| JP | 2007-092549 A | 4/2007 |
| JP | 2007-100550 A | 4/2007 |
| JP | 2010-043534 A | 2/2010 |
| JP | 2010-106825 A | 5/2010 |

* cited by examiner

# CONTROL APPARATUS AND CONTROL METHOD FOR INTERNAL COMBUSTION ENGINE

BACKGROUND OF THE INVENTION

1. Field of the Invention

The invention relates to a control apparatus and a control method for an internal combustion engine.

2. Description of Related Art

Japanese Patent Application Publication No, 2010-43534 (JP 2010-43534 A) discloses an automatic stop control apparatus for a four-cycle internal combustion engine having cylinders into which fuel is directly injected. According to the disclosure of Japanese Patent Application Publication No. 2010-43534 (JP 2010-43534 A), the torque of an alternator is controlled such that the position of a piston at the time when the engine stops rotating coincides with a target trajectory from a predetermined position wherein the engine starts stopping rotation instead of coinciding with a top dead center (a TDC) during automatic stop control of the engine. Thus, the position of the piston at the time of stoppage of the engine is controlled such that the piston can stop at a target stop position.

SUMMARY OF THE INVENTION

With the automatic stop control apparatus for the engine as described above, when the piston in any one of the cylinders stops at the top dead center (the TDC) at the time of stoppage of the engine, it may be difficult to start the engine through ignition during subsequent starting control, so the restartability of the engine may deteriorate. Therefore, there have been demands to prevent the piston from stopping at the top dead center in any one of the cylinders of the engine when the engine is stopped. According to the Japanese Patent Application Publication No. 2010-43534 (JP 2010-43534 A), the position of the piston at the time of stoppage of the engine is controlled by controlling the torque of the alternator. However, when the engine rotational speed is low immediately before stoppage of the engine, the output torque of the alternator may be small, so it may be difficult to accurately control the aforementioned target stop position. As a result, the piston may stop at the top dead center.

The invention provides a control apparatus and a control method for an internal combustion engine that keep a piston from stopping at a top dead center regardless of the magnitude of the output torque of an alternator.

A first aspect of the invention provides a control apparatus for a four-cycle internal combustion engine that includes a plurality of cylinders into which fuel is directly injected. The control apparatus includes an electronic control unit. The electronic control unit is configured to (i) execute stop control that stops rotation of a crankshaft of the internal combustion engine by stopping fuel injection and ignition in the internal combustion engine when a predetermined stop condition is fulfilled, and (ii) carry out fuel injection and ignition in a second cylinder of the plurality of the cylinders when the stop control is executed and a piston of a first cylinder of the plurality of the cylinders is estimated to stop at a top dead center, the second cylinder being in an exhaust stroke when the internal combustion engine is stopped.

According to the aforementioned configuration, when the piston of the first cylinder is estimated to stop at the top dead center, fuel injection and ignition are carried out for the second cylinder undergoing the exhaust stroke. Therefore, the pressure in the second cylinder rises due to combustion gas, and a reverse torque is generated on the crankshaft via the piston in the second cylinder. The reverse torque keeps the piston of the first cylinder from stopping at the top dead center.

In the control apparatus, the electronic control unit may be configured to carry out fuel injection and ignition in the second cylinder in a latter half of the exhaust stroke of the second cylinder when the stop control is executed. According to the aforementioned configuration, fuel injection and ignition are carried out for the cylinder undergoing the exhaust stroke in the latter half of the exhaust stroke in which an exhaust valve is closed. Accordingly, combustion gas can be restrained from leaking out from the exhaust valve, and the reverse torque generated on the crankshaft is enhanced.

In the control apparatus, the electronic control unit may be configured to advance a timing for closing an exhaust valve of the second cylinder in carrying out fuel injection and ignition in the second cylinder when the stop control is executed. According to the aforementioned configuration, combustion gas can be restrained from leaking out from the exhaust valve, and the reverse torque generated on the crankshaft is enhanced.

In the control apparatus, the electronic control unit may be configured to (i) obtain a predetermined relationship between a crank angle and a rotational speed of the internal combustion engine, the predetermined relationship includes a relationship between the crank angle and the rotational speed of the internal combustion engine when the piston stops at the top dead center when the crankshaft stops rotating, and includes a relationship between the crank angle and the rotational speed of the internal combustion engine when the piston does not stop at the top dead center when the crankshaft stops from rotating, (ii) measure a rotational speed of the internal combustion engine at each actual crank angle based on the predetermined relationship, and (iii) estimate that the piston of the first cylinder stops at the top dead center, based on the measured rotational speed. Therefore, the piston of the first cylinder can be favorably estimated to stop at the top dead center, by measuring the actual rotational speed of the internal combustion engine at each actual crank angle.

A second aspect of the invention provides a control method for a four-cycle internal combustion engine that includes a plurality of cylinders into which fuel is directly injected. The control method includes (i) executing stop control that stops rotation of a crankshaft of the internal combustion engine by stopping fuel injection and ignition in the internal combustion engine when a predetermined stop condition is fulfilled, and (ii) carrying out fuel injection and ignition in a second cylinder of the plurality of the cylinders when the stop control is executed and a piston of a first cylinder of the plurality of the cylinders is estimated to stop at a top dead center, the second cylinder being in an exhaust stroke when the internal combustion engine is stopped.

BRIEF DESCRIPTION OF THE DRAWINGS

Features, advantages, and technical and industrial significance of an exemplary embodiment of the invention will be described below with reference to the accompanying drawings, in which like numerals denote like elements, and wherein.

DETAILED DESCRIPTION OF EMBODIMENT

The embodiment of the invention will be described hereinafter in detail with reference to the drawings. In the following embodiment of the invention, the drawings are appropriately simplified or modified, and the dimensional ratios, shapes and the like of respective components are not necessarily depicted with accuracy.

Figure 1:
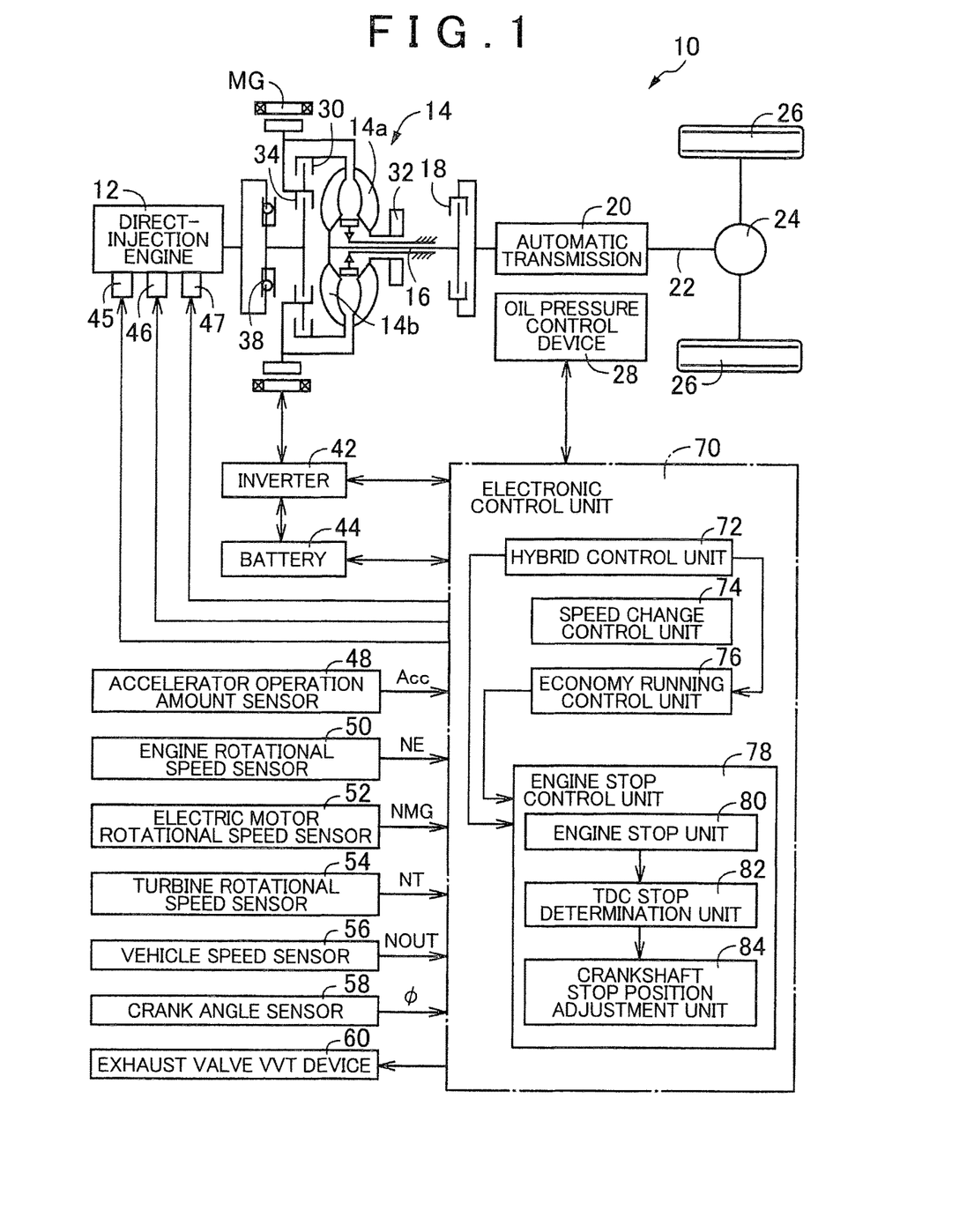
FIG. 1 is a schematic block diagram showing a skeleton of a hybrid vehicle according to the embodiment of the invention in conjunction with an essential part of a control system.

FIG. 1 is a schematic block diagram including a skeleton diagram of a drive system of a hybrid vehicle 10 according to the embodiment of the invention. The hybrid vehicle 10 is equipped with a direct-injection engine 12 that directly injects fuel into cylinders, and a motor-generator MG that functions as an electric motor and a generator, as driving force sources for running. Outputs of the direct-injection engine 12 and the motor-generator MG are transmitted from a torque converter 14 as a fluid-type transmission device to an automatic transmission 20 via a turbine shaft 16 and a C1 clutch 18, and are further transmitted to right and left driving wheels 26 via an output shaft 22 and a differential gear mechanism 24. The torque converter 14 is equipped with a lockup clutch (an L/U clutch) 30 that directly couples a pump impeller 14a and a turbine impeller 14b to each other. An oil pump 32 is integrally connected to the pump impeller 14a, and is mechanically and rotationally driven by the direct-injection engine 12 and the motor-generator MG. The direct-injection engine 12 is an internal combustion engine, and the motor-generator MG is equivalent to a rotator.

The aforementioned direct-injection engine 12 is, for example, a four-cylinder four-cycle gasoline engine. As specifically shown in FIG. 2, high-pressure atomized particles of gasoline are directly injected into a cylinder 100 by a fuel injection device 46. The direct-injection engine 12 is designed such that air flows from an intake passage 102 into the cylinder 100 via an intake valve 104, and that exhaust gas is discharged from an exhaust passage 106 via an exhaust valve 108. By being ignited by an ignition device 47 at a predetermined timing, the mixture in the cylinder 100 explodes and burns, and a piston 110 is pressed downward by combustion gas. The intake passage 102 is connected to an electronic throttle valve 45 as an intake air amount adjustment valve, via a surge tank 103. The amount of intake air flowing into the cylinder 100 from the intake passage 102, namely, the engine output is controlled in accordance with the opening degree of the electronic throttle valve 45 (the throttle valve opening degree). The exhaust valve 108 is opened/closed via an exhaust valve VVT device 60. The exhaust valve VVT device 60 is a variable valve timing device that makes the timing for closing the exhaust valve 108 variable, and changes the timing for closing the exhaust valve 108 in accordance with a signal from an electronic control unit 70 (see FIG. 1), which will be described later.

Figure 2:
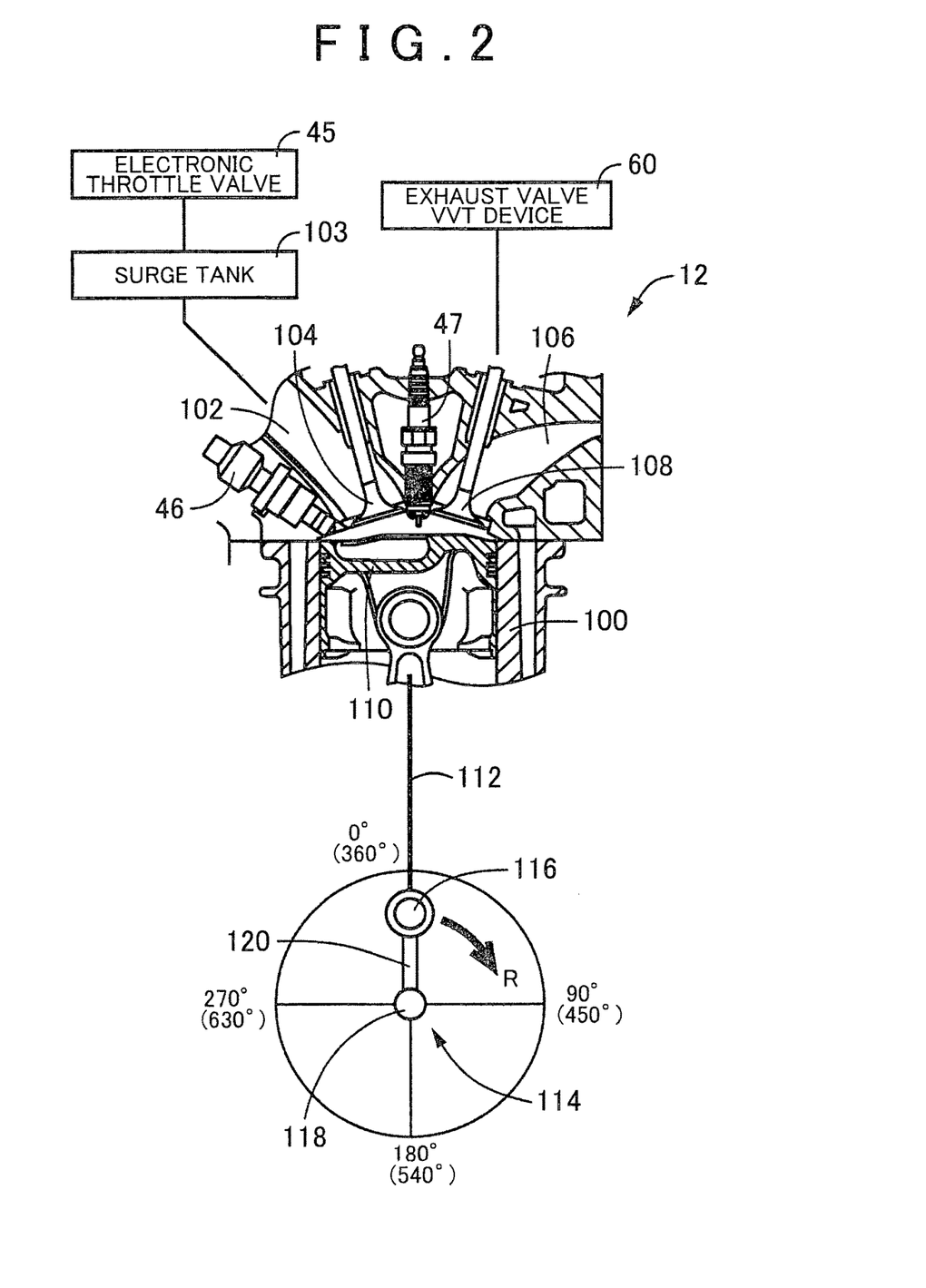
FIG. 2 is a cross-sectional view illustrating a direct-injection engine of the hybrid vehicle according to the embodiment of the invention.

The aforementioned piston 110 is axially slidably fitted in the cylinder 100, and is relatively rotatably coupled to a crankpin 116 of a crankshaft 114 via a connecting rod 112. The crankshaft 114 is rotationally driven as indicated by an arrow R, as the piston 110 makes linear reciprocating movements. The crankshaft 114 is rotatably supported by a bearing at a journal portion 118, and is integrally equipped with a crank arm 120 that connects the journal portion 118 and the crankpin 116 to each other.

Figure 3:
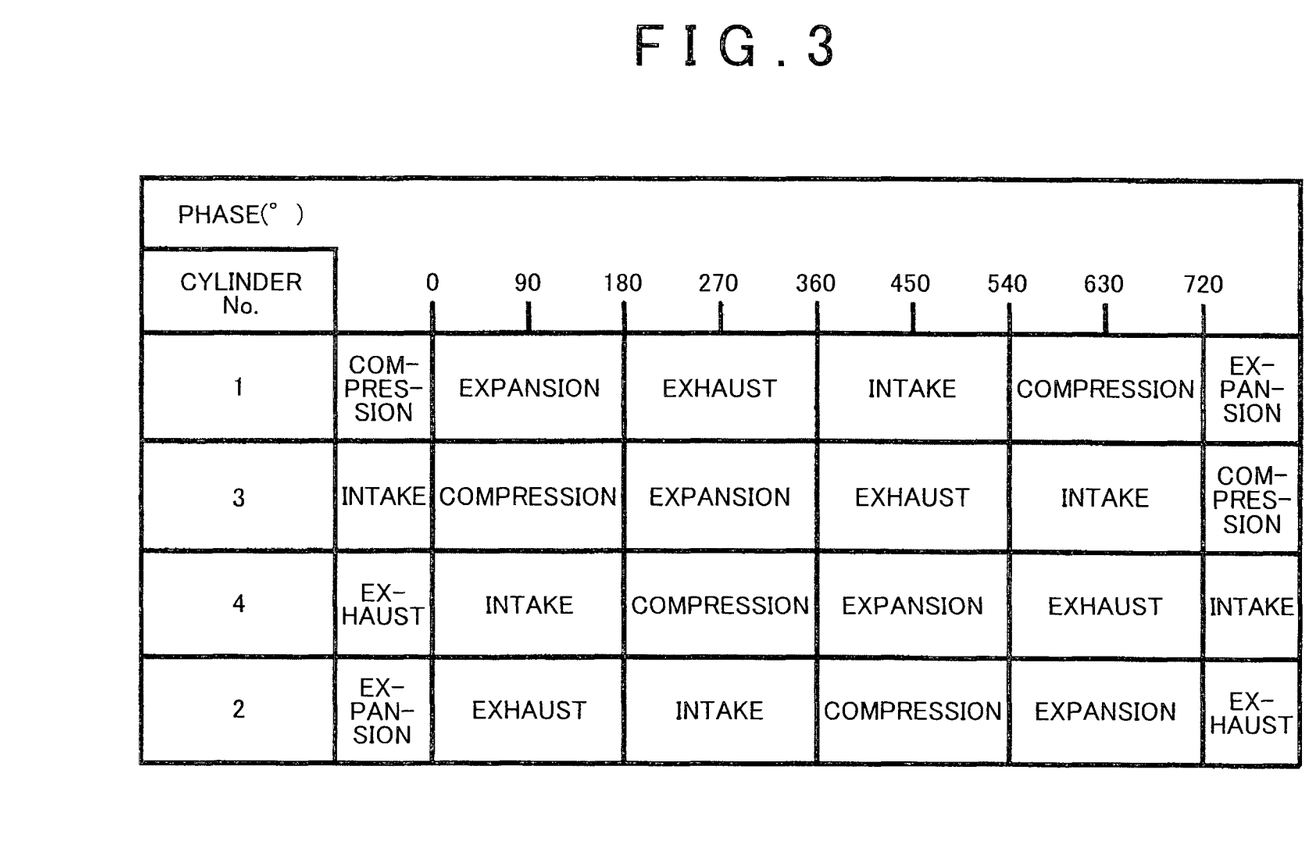
FIG. 3 is a view illustrating the sequence of four-cycle strokes that are executed in each of cylinders in a case where the direct-injection engine is a four-cylinder engine, according to the embodiment of the invention.
Figure 4:
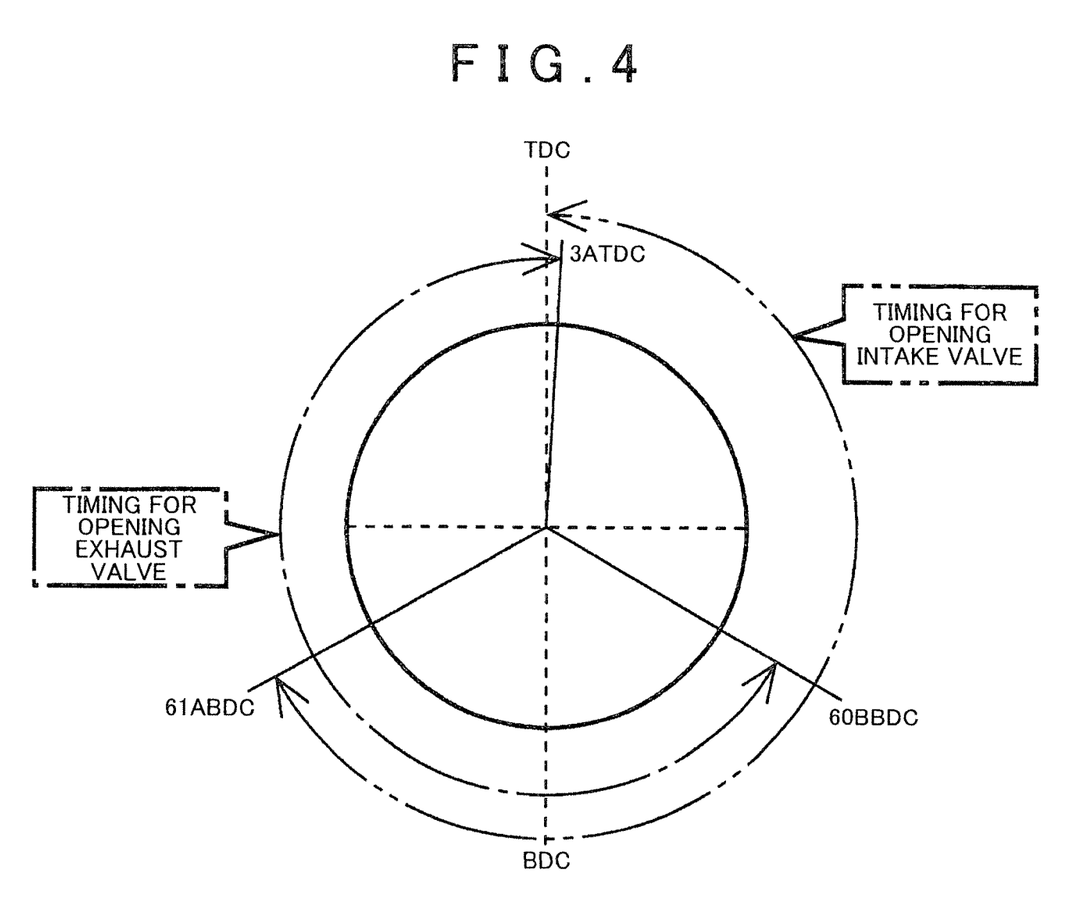
FIG. 4 is a view illustrating timings for opening an intake valve and an exhaust valve of the direct-injection engine, according to the embodiment of the invention.

In the direct-injection engine 12, four strokes, namely, an intake stroke, a compression stroke, an expansion (explosion) stroke, and an exhaust stroke are carried out while the crankshaft 114 rotates twice (by 720O), as to one cylinder. The crankshaft 114 is continuously rotated through the repetition of this process. The pistons 110 of the four cylinders 100 are configured such that crank angles ϕ thereof are offset from one another by 180°. In other words, the positions of the crankpins 116 of the crankshaft 114 protrude in directions that are offset from one another by 180°. Every time the crankshaft 114 rotates by 180°, the four cylinders 100 are subjected to explosion and combustion in a preset ignition sequence shown in, for example, FIG. 3, and a rotational torque is continuously generated. FIG. 3 is a view illustrating the operation stroke for the crank angle ϕ in each of the cylinders No. 1 to No. 4 in the case where the direct-injection engine 12 is a four-cylinder engine that operates on four cycles. The respective cylinders No. 1 to No. 4 are mechanically arranged in position, but the cylinder No. 1, the cylinder No. 3, the cylinder No. 4, and the cylinder No. 2 are ignited in this sequence with regard to 0° as the crank angle ϕ. FIG. 4 is a view illustrating an example of timings for opening the intake valve and the exhaust valve in the single cylinder 100. The intake valve 104 is opened when the crank angle ϕ is between TDC and 61ABDC during the first turn of the crankshaft 114, namely, in a region from a border between an exhaust stroke and an intake stroke to a compression stroke. The exhaust valve 108 is opened when the crank angle ϕ is 60BBDC during the second turn of the crankshaft 114, namely, in the final stage of an expansion stroke. The exhaust valve 108 is closed at 3ATDC during the first turn of the crankshaft 114 on a subsequent cycle, namely, at a border between an exhaust stroke and an intake stroke. The timing for opening this exhaust valve 108 and the timing for closing this exhaust valve 108 are changed by the exhaust valve VVT device 60.

Figure 5:
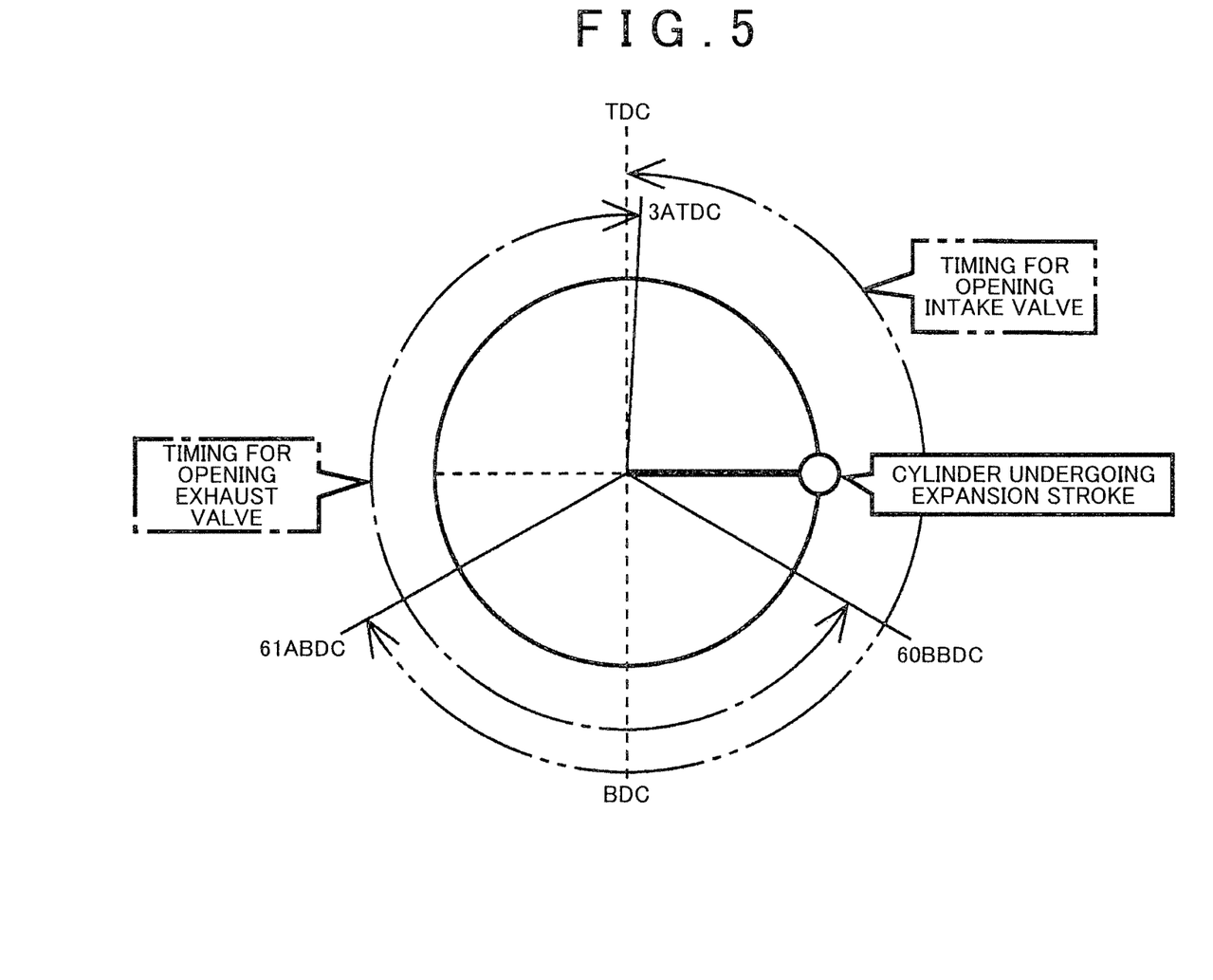
FIG. 5 is a view showing an example of a position of a piston of each of the cylinders at a time when the direct-injection engine stops rotating, according to the embodiment of the invention.

In the direct-injection engine 12, when the piston 110 of any one of the cylinders 100 is stopped within a predetermined angular range of an expansion stroke in which both the intake valve 104 and the exhaust valve 108 are closed, gasoline is injected into the cylinder 100 by the fuel injection device 46 and ignited by the ignition device 47. Thus, the mixture in the cylinder 100 is burned through explosion to start the direct-injection engine 12. The direct-injection engine 12 can be thus started through ignition. FIG. 5 shows a state where the piston 110 of any one of the cylinders 100 is stopped at an intermediate position of an expansion stroke, and both the intake valve 104 and the exhaust valve 108 are closed. Therefore, the direct-injection engine 12 can be started through generation of a large rotational torque by carrying out fuel injection and ignition for the cylinder 100. In the case of the four-cylinder direct-injection engine 12, when fuel injection and ignition are stopped, the crankshaft 114 is naturally stopped from rotating such that the piston 110 of any one of the cylinders 100, namely, any one of the cylinders No. 1 to No. 4 is usually stopped at an intermediate position (e.g., in the vicinity of 90 to 100 ATDC) of an expansion stroke, due to a relationship between potential energy and a rotational inertia force resulting from pumping action. Therefore, the direct-injection engine 12 can be started through ignition. In some cases, the direct-injection engine 12 can be started through ignition alone. In other cases, however, the direct-injection engine 12 is started through ignition while assisting the rotation of (cranking) the crankshaft 114 through the use of the motor-generator MG. In assisting the rotation of the crankshaft 114 through the use of the motor-generator MG, the assist torque can be reduced by starting the direct-injection engine 12 through ignition as described above. Accordingly, the maximum torque of the motor-generator MG is reduced, and size reduction and fuel economization can be achieved.

Referring back to FIG. 1, a K0 clutch 34 that directly couples the aforementioned direct-injection engine 12 and the aforementioned motor-generator MG to each other is provided via a damper 38, between the direct-injection engine 12 and the motor-generator MG. This K0 clutch 34 is a single plate friction clutch or a multi-plate friction clutch that is frictionally engaged by a hydraulic cylinder, and is controlled to be engaged/released by an oil pressure control device 28. The K0 clutch 34 is a hydraulic frictional engagement device, and functions as a connection/disconnection device that connects/disconnects the direct-injection engine 12 to/from a power transmission path. The motor-generator MG is connected to a battery 44 via an inverter 42. The automatic transmission 20 is a stepped automatic transmission of planetary gear type or the like in which a plurality of gear stages with different speed ratios are established in accordance with the engagement/release states of a plurality of hydraulic frictional engagement devices (clutches and brakes). The automatic transmission 20 is subjected to speed change control by an electromagnetic oil pressure control valve, a changeover valve, and the like that are provided in the oil pressure control device 28. The C1 clutch 18 functions as an input clutch of the automatic transmission 20. The C1 clutch 18 is subjected to engagement/release control by the oil pressure control device 28.

The hybrid vehicle 10 is controlled by the electronic control unit 70 shown in FIG. 1. The electronic control unit 70 is configured to include a so-called microcomputer having a CPU, a ROM, a RAM, an input/output interface, and the like. The electronic control unit 70 executes a signal processing according to a program that is stored in advance in the ROM, while utilizing a temporary storage function of the RAM. A signal indicating an operation amount of an accelerator pedal (not shown) (an accelerator operation amount) Acc is supplied to the electronic control unit 70 from an accelerator operation amount sensor 48. Signals regarding a rotational speed of the direct-injection engine 12 (an engine rotational speed) NE, a rotational speed of the motor-generator MG (an electric motor rotational speed) NMG, a rotational speed of the turbine shaft 16 (a turbine rotational speed) NT, a rotational speed of the output shaft 22 (an output shaft rotational speed that corresponds to a vehicle speed V) NOUT, a rotational angle from a top dead center (a TDC) for each of the four cylinders 100, namely, the cylinders No. 1 to No. 4 (a crank angle) φ are supplied to the electronic control unit 70 from an engine rotational speed sensor 50, an electric motor rotational speed sensor 52, a turbine rotational speed sensor 54, a vehicle speed sensor 56, and a crank angle sensor 58 respectively. Moreover, various pieces of information required for various kinds of control are supplied to the electronic control unit 70.

As shown in FIG. 1, control signals to an engine output control device that controls the output of the direct-injection engine 12 are output from the electronic control unit 70. The control signals include, for example, a drive signal, a fuel supply amount signal, an ignition signal, a command signal, a valve command signal and the like. The drive signal is to drive a throttle actuator that operates the throttle valve opening degree of the electronic throttle valve 45. The fuel supply amount signal is for controlling the amount of the fuel supplied into the cylinders 100 of the direct-injection engine 12 by the fuel injection device 46. The ignition signal is for issuing an instruction on the timing of ignition of the direct-injection engine 12 by an ignition device 47. The command signal is for commanding the motor-generator MG to operate. The valve command signal is for operating an electromagnetic valve (a solenoid valve) that are included in the oil pressure control device 28 to control a hydraulic actuator for the hydraulic frictional engagement devices (the clutches and the brakes) of the automatic transmission 20, and the like.

In the electronic control unit 70 shown in FIG. 1, a hybrid control unit 72 makes a changeover among a plurality of predetermined running modes in accordance with a driving state, for example, the accelerator operation amount Acc, the vehicle speed V, or the like, and controls the operation of the direct-injection engine 12 and the motor-generator MG such that the hybrid vehicle 10 runs in such a manner as to correspond to the plurality of the running modes. The plurality of the running modes are, for example, an engine running mode in which the vehicle runs using only the direct-injection engine 12 as a driving force source, a motor running mode in which the vehicle runs using only the motor-generator MG as a driving force source, and an engine-plus-motor running mode in which the vehicle runs using both the direct-injection engine 12 and the motor-generator MG, and the like. In the hybrid control unit 72, an engine stop signal as a request to stop the engine is supplied to a later-described engine stop control unit 78, for example, when a changeover from the aforementioned engine running mode to the aforementioned motor running mode is made, or when a changeover from the aforementioned engine-plus-motor running mode to the aforementioned motor running mode is made.

A speed change control unit 74 functions as speed change control means for shifting the automatic transmission 20. For example, the speed change control unit 74 determines whether or not the automatic transmission 20 should be shifted, namely, makes a determination on the shift speed to which the automatic transmission 20 should be shifted, based on a vehicle state that is indicated by a required output torque of the automatic transmission 20 corresponding to the actual vehicle speed V, the actual accelerator opening degree Acc, or the like, from a speed change map. The speed change map has an upshift line and a downshift line, which is stored in advance using, for example, the vehicle speed V and an output torque $T_{OUT}$ (or the accelerator opening degree Acc or the like) as variables. The speed change control unit 74 controls the hydraulic frictional engagement devices (the clutches and the brakes) of the automatic transmission 20 such that the determined shift speed is obtained.

An economy running control unit 76 executes economy running control, namely, disconnects the direct-injection engine 12 from the power transmission path by releasing the K0 clutch 34 under a certain condition, and stops the operation of the direct-injection engine 12 to improve fuel economy, when, for example, the engine-plus-motor running mode or the engine running mode is selected in the hybrid control unit 72 to cause the vehicle, for example, to coast with the accelerator OFF or run while decelerating. In the economy running control unit 76, when, for example, the engine-plus-motor running mode or the engine running mode is selected in the hybrid control unit 72 to cause the vehicle, for example, to coast with the accelerator OFF or run while decelerating, an engine stop signal as a request to stop the engine is supplied to the later-described engine stop control unit 78.

The engine stop control unit 78 executes engine stop control such that the crankshaft 114 of the direct-injection engine 12 stops in the vicinity an intermediate position of an expansion stroke of the piston 110 of any one of the cylinders 100, namely, any one of the cylinders No. 1 to No. 4, for example, when an engine stop signal as a request to stop the engine is supplied to the engine stop control unit 78 from the hybrid control unit 72, or when an engine stop signal as a request to stop the engine is supplied to the engine stop control unit 78 from the economy running control unit 76.

The engine stop unit 80 disconnects the direct-injection engine 12 from the power transmission path by, for example, releasing the K0 clutch 34, stops fuel injection by the fuel injection device 46 (suspends the supply of fuel), and stops ignition control for the ignition device 47, for example, when the engine stop signal is supplied to the engine stop unit 80 from the hybrid control unit 72 or the economy running control unit 76.

Figure 6:
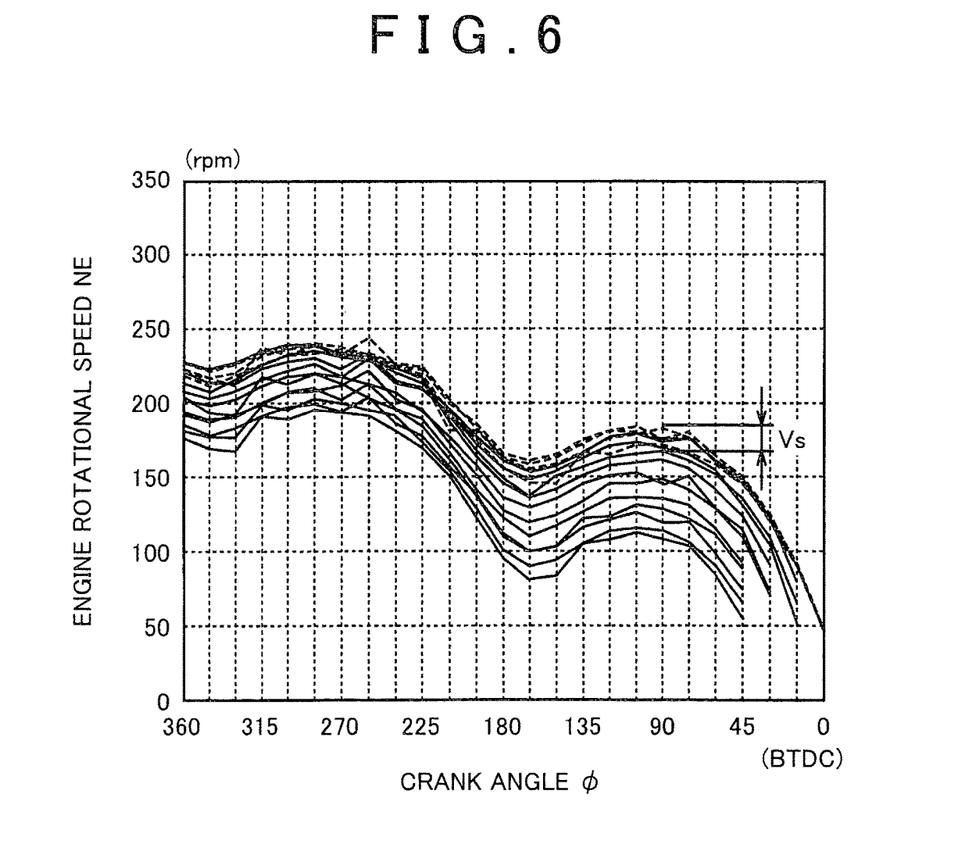
FIG. 6 is a view illustrating a determination rotational speed Vs at a time when an electronic control unit estimates whether or not a piston stops at a top dead center, according to the embodiment of the invention.

A TDC stop determination unit 82 estimates a stop position of the crankshaft 114 at the time when the direct-injection engine 12 stops rotating, when the K0 clutch 34 is released by the engine stop unit 80, fuel injection by the fuel injection device 46 is stopped, and ignition control for the ignition device 47 is stopped. The TDC stop determination unit 82 determines whether or not there is a possibility of the piston 110 stopping at the top dead center (the TDC) in any one of the cylinders No. 1 to No. 4 from the estimated stop position of the crankshaft 114. That is, as shown in FIG. 6, the TDC stop determination unit 82 obtains in advance a relationship between the crank angle φ and the engine rotational speed NE through an experiment, a simulation or the like in the case of TDC stop where the crankshaft 114 stops with the piston 110 stopped at the top dead center (the TDC) in any one of the cylinders No. 1 to No. 4 or in the case where the crankshaft 114 does not stop at the aforementioned TDC when the crankshaft 114 is stopped from rotating by stopping fuel injection and ignition for the direct-injection engine 12. The TDC stop determination unit 82 measures the engine rotational speed NE at each detected actual crank angle φ based on, for example, the relationship as shown in FIG. 6. The TDC stop determination unit 82 estimates, based on the engine rotational speed NE at each measured actual crank angle φ, whether or not the crankshaft 114 stops at the aforementioned TDC, and estimates a stop position of the aforementioned crankshaft 114. The TDC stop determination unit 82 estimates a stop position of the crankshaft 114 as described above, and determines that there is a possibility of the crankshaft 114 stopping at the aforementioned TDC when the crankshaft 114 is estimated to stop at the aforementioned TDC. The TDC stop determination unit 82 determines that there is no possibility of the crankshaft 114 stopping at the aforementioned TDC when the crankshaft 114 is not estimated to stop at the aforementioned TDC.

The aforementioned FIG. 6 is a result obtained by investigating a relationship between the crank angle φ and the engine rotational speed NE within a range of 360° immediately prior to stoppage of the crankshaft 114. In FIG. 6, broken curves indicate a case where the crankshaft stops at the aforementioned TDC (a case where the crankshaft stops rotating at BTDC=0 at the right end), and solid curves indicate a case where the crankshaft does not stop at the aforementioned TDC. As a result of this, when the engine rotational speed NE is within a rotational speed range Vs, for example, at 90BTDC (at a position ahead of the TDC by 90°), the crankshaft is relatively highly likely to stop at the aforementioned TDC, so the rotational speed range Vs is set as a determination rotational speed. If the engine rotational speed NE is within the range of the determination rotational speed Vs when the crank angle φ is 90BTDC, it can be determined (estimated) that there is a high possibility of the crankshaft stopping at the aforementioned TDC. If the engine rotational speed NE at the time when the crank angle φ is 90BTDC is lower than the determination rotational speed Vs, it can be determined that there is a low possibility of the crankshaft stopping at the aforementioned TDC. The stoppage of the crankshaft at the aforementioned TDC disperses or varies with time depending on the individual difference in the direct-injection engine 12. Accordingly, it is desirable to sequentially learn (store) a correlation therebetween and correct (update) the determination rotational speed Vs every time stop control is executed. As indicated by the solid curves of FIG. 6, the crankshaft stops rotating at 15BTDC to 45BTDC, but the actual stop position is about 70 to 115BTDC due to the rebound resulting from pumping action. For example, the crankshaft stops rotating with the piston 110 located as shown in FIG. 5. The map of the relationship as shown in the aforementioned FIG. 6 is provided, for example, for each of the cylinders No. 1 to No. 4. The TDC stop determination unit 82 determines whether or not there is a possibility of the piston 110 stopping at the top dead center in the cylinder 100 in each of the cylinders No. 1 to No. 4.

If the TDC stop determination unit 82 determines that there is a possibility of the crankshaft 114 stopping at the TDC when the direct-injection engine 12 stops rotating, a crankshaft stop position adjustment unit 84 determines whether or not the position of the crankshaft 114, namely, the crank angle φ has become a predetermined set value A of 90ABDC to 180ABDC with the piston 110 in the latter half of an exhaust stroke, in the cylinder 100 undergoing the exhaust stroke. If it is determined that the position of the crankshaft 114 has become the set value A in the latter half of the exhaust stroke as described above, the crankshaft stop position adjustment unit 84 executes crankshaft stop position adjustment control, namely, carries out fuel injection and ignition for the cylinder 100 undergoing the exhaust stroke and generates a reverse torque F on the crankshaft 114 such that the crankshaft 114 does not stop at the aforementioned TDC, thus adjusting the stop position of the crankshaft 114. The aforementioned set value A is a predetermined position of the crankshaft 114 at which the exhaust valve 108 is closed or substantially closed in the cylinder 100 undergoing an exhaust stroke. If it is determined that the position of the crankshaft 114 has become the set value A in the latter half of the exhaust stroke as described above, the crankshaft stop position adjustment unit 84 advances the timing for closing the exhaust valve 108 of the cylinder 100 undergoing the exhaust stroke, with the aid of the exhaust valve VVT device 60.

Figure 7:
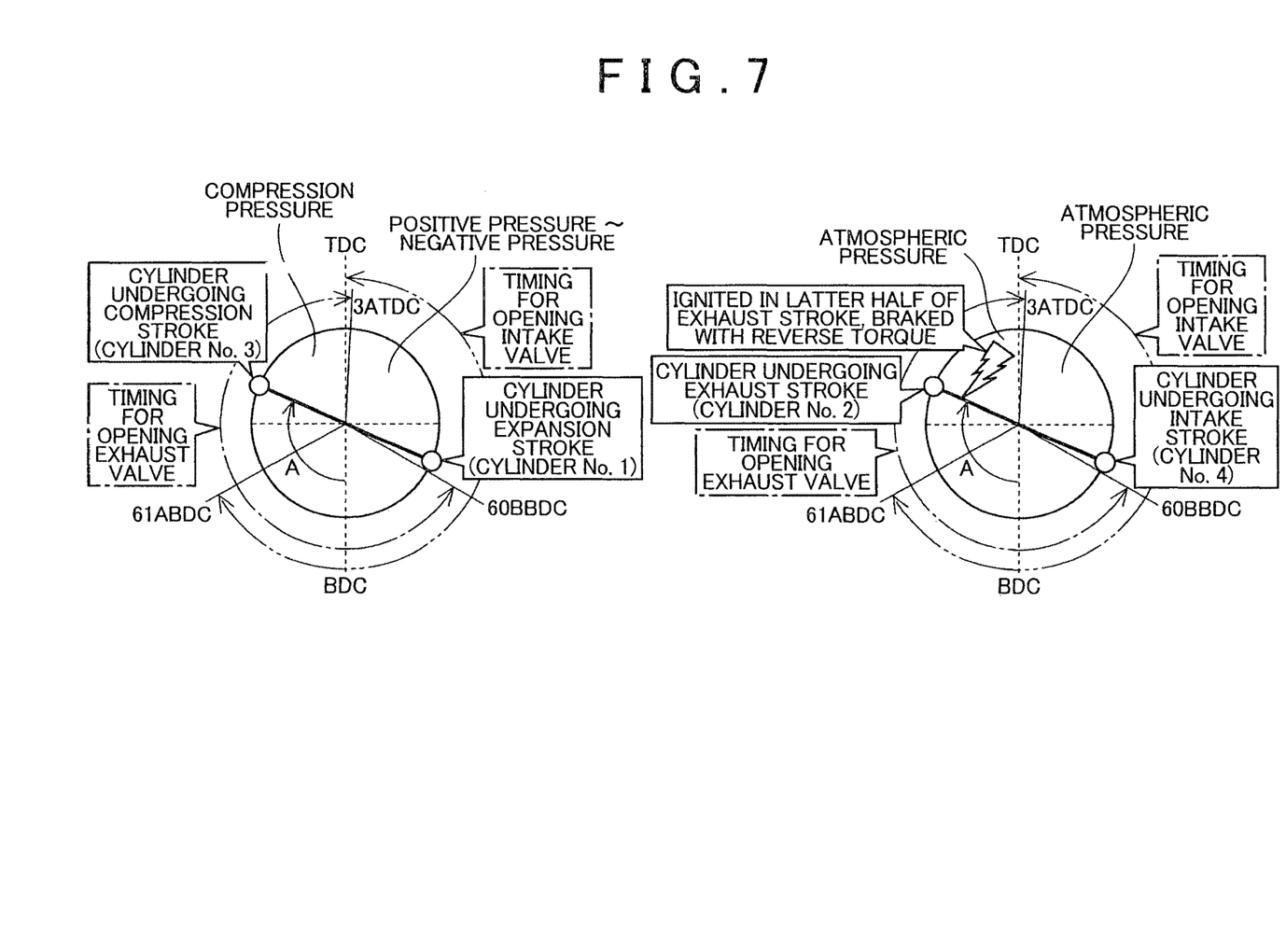
FIG. 7 is a view illustrating crankshaft stop position adjustment control according to the embodiment of the invention.
Figure 8:
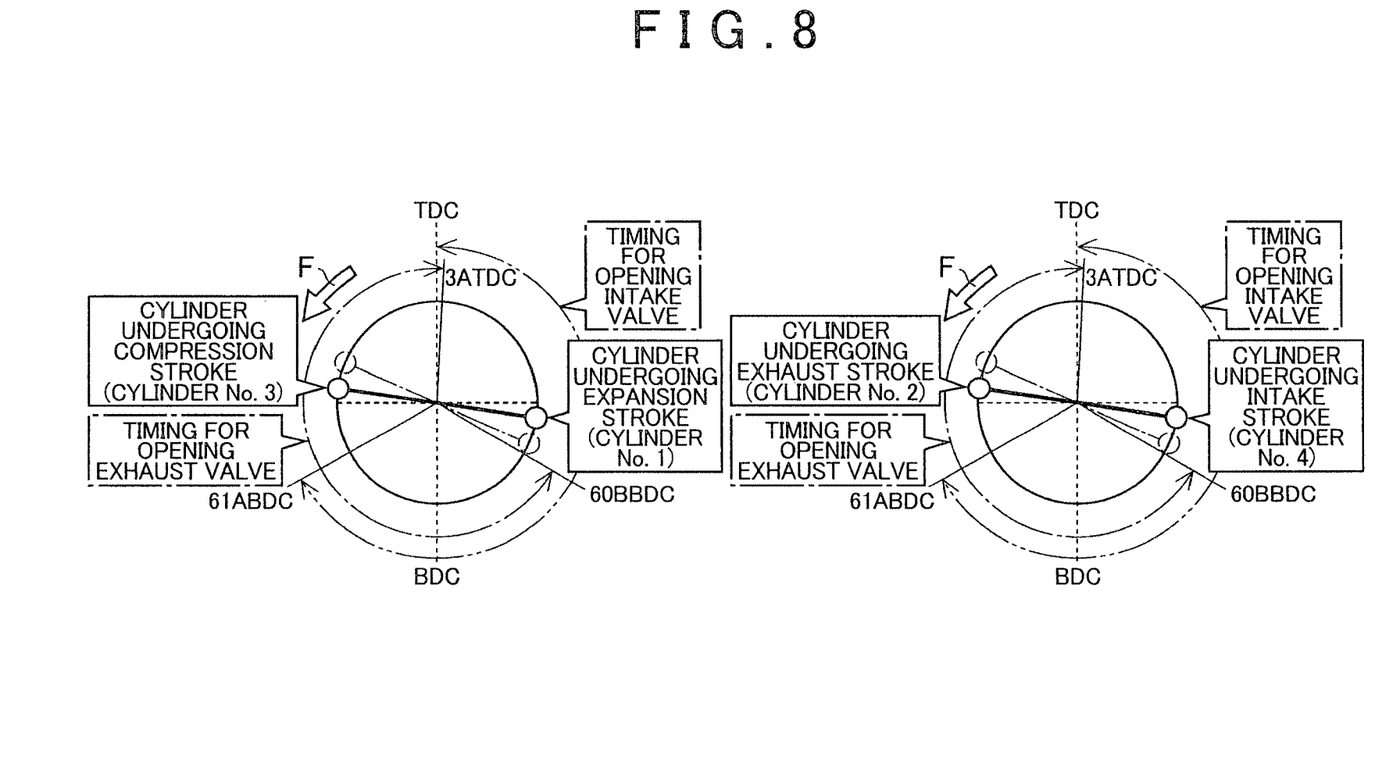
FIG. 8 is a view showing positions of pistons of the cylinders No. 1 to No. 4 after the execution of crankshaft stop position adjustment control, according to the embodiment of the invention.

FIG. 7 is a view specifically illustrating the aforementioned crankshaft stop position adjustment control by the aforementioned crankshaft stop position adjustment unit 84. As shown in the aforementioned FIG. 7, if the TDC stop determination unit 82 estimates that the piston 110 stops at the top dead center (the TDC), for example, in the cylinder No. 3 (the first cylinder) undergoing a compression stroke, the aforementioned crankshaft stop position adjustment unit 84 allows the fuel injection device 46 to inject fuel into the cylinder No. 2 (the second cylinder) undergoing an exhaust stroke, which is an opposite cylinder spaced apart from the cylinder No. 3 undergoing the compression stroke by 360°, and allows the ignition device 47 to ignite the fuel, when the position of the crankshaft 114 enters the latter half of the aforementioned exhaust stroke. Thus, the pressure in the cylinder No. 2 rises due to combustion gas, and the reverse torque F is generated on the crankshaft 114 via the piston 110 (see FIG. 8). Therefore, as shown in FIG. 8, the crankshaft 114 reversely rotates and stops due to the aforementioned reverse torque F. Therefore, the piston 110 of the cylinder No. 3 is prevented from stopping at the top dead center (the TDC), and the piston of the preceding cylinder, namely, the cylinder No. 1 undergoing an expansion stroke is stopped in the vicinity of the center of the expansion stroke. FIG. 8 is a view showing the positions of the pistons 110 of the cylinders No. 1 to No. 4 after the execution of the aforementioned crankshaft stop position adjustment control by the aforementioned crankshaft stop position adjustment unit 84. The aforementioned reverse torque F is a force that rotates the crankshaft 114 reversely to the rotational direction of the crankshaft 114 with the direct-injection engine 12 driven, namely, a direction indicated by an arrow R shown in FIG. 2.

Figure 9:
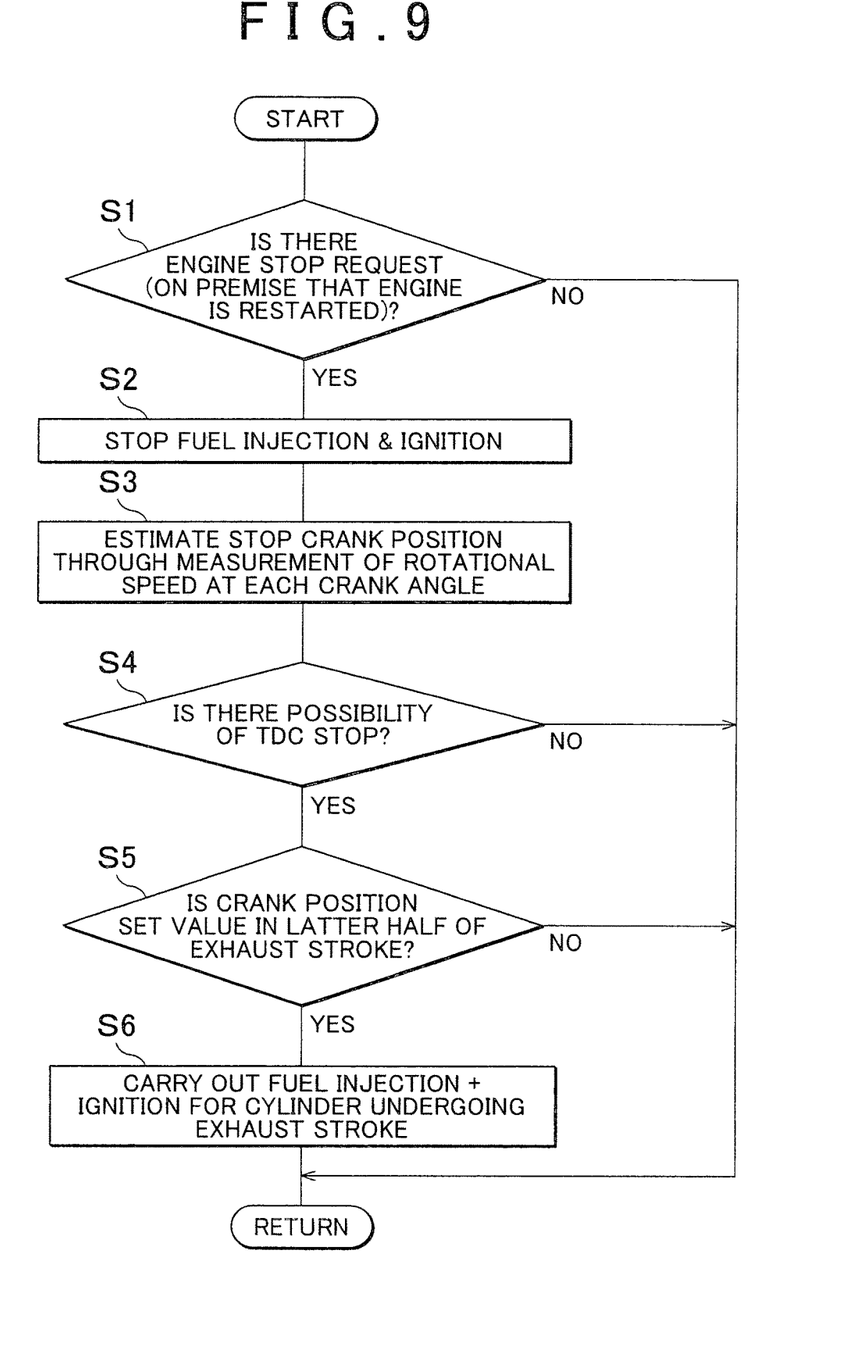
FIG. 9 is a flowchart illustrating an example of the control operation of engine stop control, according to the embodiment of the invention.

FIG. 9 is a flowchart illustrating an example of the control operation of engine stop control in which the electronic control unit 70 stops the crankshaft 114 of the direct-injection engine 12 from rotating such that the piston 110 in any one of the cylinders No. 1 to No. 4 stops at an intermediate position of an expansion stroke, when an engine stop signal as a request to stop the engine is output from the hybrid control unit 72 or the economy running control unit 76. This control is repeatedly executed on a predetermined control cycle. Incidentally, the aforementioned electronic control unit 70 functions as an automatic stop control apparatus that automatically stops the direct-injection engine 12.

First of all, in step (this term will be omitted hereinafter) S1 corresponding to the hybrid control unit 72 and the economy running control unit 76, it is determined whether or not an engine stop request has been made to the engine stop control unit 78 from the hybrid control unit 72 or the economy running control unit 76, namely, whether or not an engine stop signal has been supplied thereto. If the result of the determination in this S1 is negative, the present routine is ended. However, if the result of the determination in S1 is positive, S2 corresponding to the engine stop unit 80 is executed. In the aforementioned S2, the K0 clutch 34 is released, the direct-injection engine 12 is disconnected from the power transmission path, fuel injection by the fuel injection device 46 is stopped (the supply of fuel is suspended), and ignition control of the ignition device 47 is stopped.

Next, S3 corresponding to the TDC stop determination unit 82 is executed. In the aforementioned S3, a relationship between the crank angle φ and the engine rotational speed NE in the case where the crankshaft 114 stops at the TDC or where the crankshaft 114 does not stop at the TDC when the direct-injection engine 12 stops rotating is obtained in advance through an experiment, a simulation or the like. The engine rotational speed NE at each actual crank angle φ is measured from, for example, a relationship as shown in FIG. 6, and it is estimated whether or not the crankshaft 114 stops at the TDC. Then, the stop position of the aforementioned crankshaft 114 is estimated.

Next, S4 corresponding to the TDC stop determination unit 82 is executed. In the S4, a determination is made in accordance with the stop position of the crankshaft 114 estimated in the S3. If the crankshaft 114 is estimated to stop at the TDC, it is determined that there is a possibility of the crankshaft 114 stopping at the TDC. If the crankshaft 114 is not estimated to stop at the TDC, it is determined that there is no possibility of the crankshaft 114 stopping at the TDC. If the result of the determination in this S4 is negative, the present route is ended. However, if the result of the determination in S4 is positive, for example, if there is a possibility of the piston 110 stopping at the TDC in the cylinder No. 3 undergoing a compression stroke as shown in FIG. 7, S5 corresponding to the crankshaft stop position adjustment unit 84 is executed.

In the aforementioned S5, it is determined whether or not the position of the crankshaft 114, namely, the crank angle φ has become the predetermined set value A in or after the latter half of an exhaust stroke in the cylinder No. 2 undergoing the exhaust stroke as shown in, for example, FIG. 7, in the cylinder 100 undergoing an exhaust stroke. If the result of the determination in this S5 is negative, the present routine is ended. However, if the result of the determination in S5 is positive, S6 corresponding to the crankshaft stop position adjustment unit 84 is executed. In the aforementioned S6, the timing for closing the exhaust valve 108 of the cylinder No. 2 undergoing the exhaust stroke is advanced by the exhaust valve VVT device 60, and fuel is injected into the cylinder No. 2 undergoing the exhaust stroke by the fuel injection device 46 and then ignited by the ignition device 47. Thus, the pressure in the cylinder No. 2 undergoing the aforementioned exhaust stroke rises, and the reverse torque F is generated on the crankshaft 114 via the piston 110. Therefore, the crankshaft 114 reversely rotates and stops due to the reverse torque F. As shown in FIG. 8, the piston 110 of the cylinder No. 3 undergoing a compression stroke is prevented from stopping at the top dead center (the TDC), and the piston 110 of the preceding cylinder, namely, the cylinder No. 1 undergoing an expansion stroke is stopped in the vicinity of the center of the expansion stroke.

In the present embodiment of the invention, when fuel injection by the fuel injection device 46 is stopped and ignition control for the ignition device 47 is stopped by the aforementioned S2, the crankshaft 114 is naturally stopped from rotating in general with a probability of, for example, about 90 to 95% at a position where the piston 110 of any one of the cylinders 100 stops at an intermediate position of the expansion stroke as shown in FIG. 5. The engine can be directly started through ignition when a request to restart the engine is made. Then, the piston 110 of any one of the cylinders 100 stops at the position of the TDC (the top dead center) with a probability of about 5 to 10%. However, in the present embodiment of the invention, if it is determined in the aforementioned S4 that there is a possibility of the piston 110 stopping at the top dead center (the TDC) in any one of the cylinders 100, fuel injection and ignition for the cylinder 100 undergoing an exhaust stroke are carried out in the latter half of the exhaust stroke in the aforementioned S5 and S6. Therefore, the pressure in the cylinder 100 undergoing the aforementioned exhaust stroke rises, and the reverse torque F is generated, so the crankshaft 114 reversely rotates and stops due to the reverse torque F, and the piston 110 of the cylinder 100 undergoing an expansion stroke is stopped at an intermediate position of the expansion stroke.

Incidentally, unlike the present embodiment of the invention, an avoidance method for keeping the piston 110 from stopping at the top dead center (the TDC) when the crankshaft 114 is estimated to stop with the piston 110 at the top dead center (the TDC) in any one of the cylinders 100 is conceivable. For example, according to this avoidance method, when the piston 110 is estimated to stop at the top dead center (the TDC) in any one of the cylinders 100, the electronic throttle valve 45 is fully closed to reduce the compressive reactive force and cause the piston 110 to move past the top dead center (the TDC), so the piston 110 is kept from stopping at the top dead center. Alternatively, according to this avoidance method, the electronic throttle valve 45 is fully opened from its fully closed state to increase the compressive reactive force and stop the piston 110 ahead of the top dead center (the TDC), so the piston 110 is kept from stopping at the top dead center. However, according to this avoidance method, while a new control function is simply added to the electronic control unit 70 as is the case with the present embodiment and hence there is no cost increase, a delay in response to pressure corresponding to the volume of an intake pipe may be occur. Another avoidance method, for example, providing a switching element for turning on/off the energization of a starter motor is conceivable. When the piston 110 is stopped at the top dead center (the TDC) in any one of the cylinders 100, the starter driving current is adjusted by the switching element, and the crankshaft 114 is rotated by a small amount. Thus, the piston 110 is kept from stopping at the top dead center. According to this avoidance method, the starter motor is used to rotate the crankshaft 114 and move the stop position of the piston 110 of the cylinder 100 from the top dead center, so the piston 110 is reliably kept from stopping at the top dead center. However, the switching element that adjusts the aforementioned starter driving current needs to be provided, which leads to an increase in cost. Furthermore, when the number of times of operation of the starter motor increases, the starter motor needs to be designed to withstand the increased number of times of operation, so the cost increases. In contrast, the present embodiment of the invention makes it possible to reliably keep the piston 110 from stopping at the top dead center (the TDC) without causing an increase in cost in comparison with the avoidance methods as described above.

As described above, with the automatic stop control apparatus (the electronic control unit 70) for the direct-injection engine 12 according to the present embodiment of the invention, when the piston 110 of the cylinder 100 as the cylinder No. 3 is estimated to stop at the top dead center (the TDC), fuel injection and ignition are carried out for the cylinder 100 as the cylinder No. 2 undergoing an exhaust stroke. Therefore, the pressure rises in the cylinder No. 2 due to combustion gas, the reverse torque F is generated on the crankshaft 114 via the piston 110 in the cylinder No. 2. The reverse torque F reliably keeps the piston 110 of the cylinder No. 3 from stopping.

With the automatic stop control device for the direct-injection engine 12 according to the present embodiment of the invention, fuel injection and ignition are carried out for the cylinder No. 2 undergoing an exhaust stroke, in the latter half of the exhaust stroke of the cylinder No. 2. Therefore, fuel injection and ignition are carried out for the cylinder No. 2 undergoing the exhaust stroke, in the latter half of the exhaust stroke in which the exhaust valve 108 is closed. Therefore, combustion gas can be restrained from leaking out from the exhaust valve 108, and the reverse torque F generated on the crankshaft 114 is enhanced.

With the automatic stop control apparatus for the direct-injection engine 12 according to the present embodiment of the invention, when fuel injection and ignition are carried out for the cylinder No. 2 undergoing an exhaust stroke, the timing for closing the exhaust valve 108 of the cylinder No. 2 is advanced. Therefore, combustion gas can be restrained from leaking out from the exhaust valve 108, and the reverse torque F generated on the crankshaft 114 is enhanced.

With the automatic stop control apparatus for the direct-injection engine 12 according to the present embodiment of the invention, the piston 110 of the cylinder No. 3 undergoing a compression stroke is estimated to stop at the top dead center by obtaining in advance a relationship between the crank angle $\phi$ and the rotational speed NE of the direct-injection engine 12 in the case where the piston 110 stops at the top dead center or where the piston 110 does not stop at the top dead center when the crankshaft 114 is stopped from rotating, and by measuring the rotational speed NE of the direct-injection engine 12 at each actual crank angle $\phi$ from the relationship. Therefore, the piston 110 of the cylinder No. 3 undergoing the compression stroke can be favorably estimated to stop at the top dead center, by measuring the rotational speed NE of the direct-injection engine 12 at each actual crank angle $\phi$.

While the embodiment of the invention has been described above in detail based on the drawings, the invention is applicable in other aspects as well.

For example, in the foregoing embodiment of the invention, the direct-injection engine 12 is a four-cylinder gasoline engine having the four cylinders 100, namely, the cylinders No. 1 to No. 4. However, the direct-injection engine 12 to which the invention is applied is not limited to a four-cylinder engine, but may be any other type of engine such as a six-cylinder engine, an eight-cylinder engine or the like.

In the foregoing embodiment of the invention, an engine stop signal from the hybrid control unit 72 or the economy running control unit 76 is supplied to the engine stop control unit 78, whereby engine stop control is executed by the engine stop control unit 78. However, engine stop control may be executed by the aforementioned engine stop control unit 78 at the time of, for example, idling stop, that is, when the engine is stopped during stoppage of the vehicle.

The foregoing is nothing more than the embodiment of the invention. The invention can be carried out after being subjected to various modifications and improvements based on the knowledge of those skilled in the art.

What is claimed is:

1. A control apparatus for a four-cycle internal combustion engine, the four-cycle internal combustion engine including a crankshaft and a plurality of cylinders into which fuel is directly injected, the control apparatus comprising:
   an electronic control unit configured to:

(i) execute stop control that stops rotation of the crankshaft by stopping fuel injection and ignition in the four-cycle internal combustion engine when a predetermined stop condition is fulfilled; and (ii) carry out fuel injection and ignition in a second cylinder of the plurality of the cylinders when the stop control is executed and a piston of a first cylinder of the plurality of the cylinders is estimated to stop at a top dead center, the second cylinder being in an exhaust stroke when the four-cycle internal combustion engine is stopped.

2. The control apparatus according to claim 1, wherein the electronic control unit is configured to carry out fuel injection and ignition in the second cylinder in a latter half of the exhaust stroke of the second cylinder when the stop control is executed.

3. The control apparatus according to claim 1, wherein the electronic control unit is configured to advance a timing for closing an exhaust valve of the second cylinder in carrying out fuel injection and ignition in the second cylinder when the stop control is executed.

4. The control apparatus according to claim 1, wherein the electronic control unit is configured to:

(i) obtain a predetermined relationship between a crank angle and a rotational speed of the four-cycle internal combustion engine, the predetermined relationship includes a relationship between the crank angle and the rotational speed of the four-cycle internal combustion engine when the crankshaft stops rotating and the piston stops at the top dead center, and includes a relationship between the crank angle and the rotational speed of the four-cycle internal combustion engine when the crankshaft stops rotating and the piston does not stop at the top dead center, (ii) measure a rotational speed of the four-cycle internal combustion engine at each actual crank angle based on the predetermined relationship; and (iii) estimate that the piston of the first cylinder stops at the top dead center, based on the measured rotational speed.

5. A control method for a four-cycle internal combustion engine controlled by an electronic control unit, the four-cycle internal combustion engine including a crankshaft and a plurality of cylinders into which fuel is directly injected, the control method comprising:

(i) executing, by the electronic control unit, stop control that stops rotation of the crankshaft by stopping fuel injection and ignition in the four-cycle internal combustion engine when a predetermined stop condition is fulfilled, and (ii) carrying out, by the electronic control unit, fuel injection and ignition in a second cylinder of the plurality of the cylinders when the stop control is executed and a piston of a first cylinder of the plurality of the cylinders is estimated to stop at a top dead center, the second cylinder being in an exhaust stroke when the four-cycle internal combustion engine is stopped.

* * * * *